United States Patent [19]

Weiler et al.

[11] Patent Number: 5,152,376
[45] Date of Patent: Oct. 6, 1992

[54] SEAL FOR AN ACTUATING DEVICE FOR A DRUM BRAKE

[75] Inventors: Rolf Weiler, Eppstein; Claus-Peter Panek, Steinbach; Juergen Musolf, Frankfurt am Main, all of Fed. Rep. of Germany

[73] Assignee: Alfred Teves GmbH, Frankfurt am Main, Fed. Rep. of Germany

[21] Appl. No.: 664,919

[22] Filed: Mar. 5, 1991

[30] Foreign Application Priority Data

Mar. 5, 1990 [DE] Fed. Rep. of Germany ....... 4006857

[51] Int. Cl.$^5$ .................................................. B60T 1/00
[52] U.S. Cl. ............................... 188/2 D; 277/212 FB; 277/181; 188/78
[58] Field of Search .................... 188/78, 326, 2 D; 377/212 FB, 181, 182, 183, 186, 189

[56] References Cited

U.S. PATENT DOCUMENTS

| | | | |
|---|---|---|---|
| 1,750,611 | 3/1930 | Blackmore. | |
| 2,305,265 | 12/1942 | Le Tourneau | 287/90 |
| 2,432,803 | 12/1947 | Rice | 64/32 |
| 3,468,171 | 9/1969 | Macielinski | 74/18.1 |
| 3,871,493 | 3/1975 | Mathias | 188/2 D X |
| 3,905,246 | 9/1975 | Breckerfelder | 277/212 FB X |
| 4,229,010 | 10/1980 | St. Laurent, Jr. | 277/212 FB X |
| 4,322,175 | 3/1982 | Szczesny | 277/212 FB X |
| 4,570,943 | 2/1986 | Houseman et al. | 277/212 FB X |
| 4,637,747 | 1/1987 | Perrin et al. | 277/212 FB X |
| 4,991,457 | 2/1991 | Chen | 277/212 FB X |

FOREIGN PATENT DOCUMENTS

| | | |
|---|---|---|
| 0138659 | 4/1985 | European Pat. Off.. |
| 0271819 | 12/1987 | European Pat. Off.. |
| 0299850 | 1/1989 | European Pat. Off.. |
| 0309079 | 3/1989 | European Pat. Off.. |
| 0287423 | 5/1970 | Fed. Rep. of Germany. |
| 0717174 | 5/1988 | Fed. Rep. of Germany. |
| 3812495 | 10/1989 | Fed. Rep. of Germany. |
| 3814695 | 10/1989 | Fed. Rep. of Germany ...... 277/212 FB |
| 1141131 | 3/1957 | France .......................... 277/212 FB |
| 1452991 | 10/1976 | United Kingdom. |
| 1572849 | 8/1980 | United Kingdom. |
| 1599495 | 10/1981 | United Kingdom. |

OTHER PUBLICATIONS

Patent abstracts of Japan–Mar. 8, 1986 vol. 10 No. 59.

Primary Examiner—Robert J. Oberleitner
Assistant Examiner—Lee W. Young
Attorney, Agent, or Firm—Robert P. Seitter; J. Gordon Lewis

[57] ABSTRACT

A seal arrangement is disclosed for an actuating device of a drum brake furnished with an actuating lever which projects through the brake carrier. This arrangement includes an oval pleated bellows (1) fastened by a clamping ring (14) having teeth (15) arranged on its external edge (30) pressed into the wall of a matching, generally elliptical recess. Preferably, the pleated bellows is of asymmetrical configuration and is in a largely unloaded condition in the actuating position of the actuating lever.

13 Claims, 2 Drawing Sheets

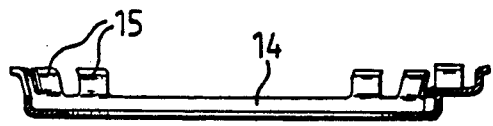
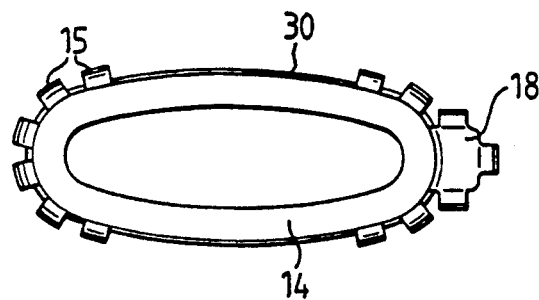
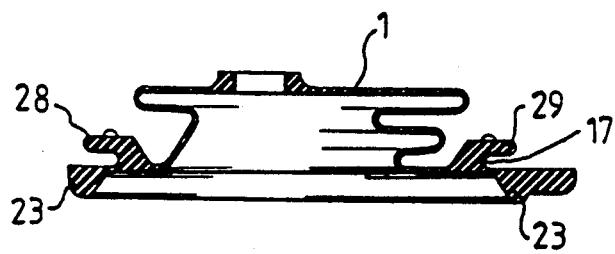
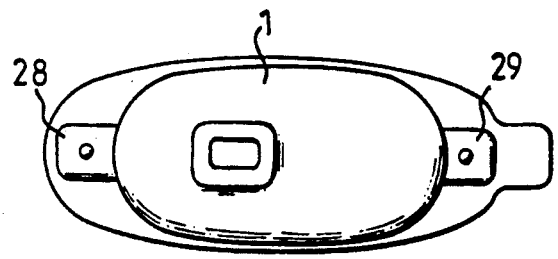

SEAL FOR AN ACTUATING DEVICE FOR A DRUM BRAKE

The present invention relates to actuating devices for drum brakes for passenger vehicles and more particularly, for seals employed with such actuating devices.

BACKGROUND OF THE INVENTION

Usually drum brakes are operated by a Bowden cable which extends via corresponding deflection means into the brake drum and/or the brake bowl. Details can be taken from page 135 of the Brake Handbook, 9th edition (Bartsch publishing house) or from FIGS. 4 and 5 and the pertinent description of EP-OS 309 079. Deflection of the Bowden cable as well as a corresponding seal entail difficulties. Therefore, one has proceeded to provide the actuating device with an actuating lever which projects through a corresponding aperture in the brake carrier into the brake drum. The end of the actuating lever disposed within the brake drum actuates the brake shoes, e.g. by way of an expanding lock (see the above-mentioned literature), while a Bowden cable makes catch at the end of the actuating lever disposed outside of the drum in the direction of trajectory motion.

In order to not impair the effect of the drum brake by the ingress of spray water, it has been suggested to seal the through hole where the brake lever passes through by providing a flat seal with a corresponding slot permitting the swing movement of the actuating lever. However, because of the lever's extension transversely to the direction of slot, the seal's slot is always somewhat open on both sides of the brake lever so that sufficient sealing of the brake drum vis-a-vis spray water is not safeguarded.

BRIEF DESCRIPTION OF THE INVENTION

Therefore, the present invention sets out from a seal for an actuating device of a drum brake corresponding to the type described in the preamble of the main claim and has for its object to improve such a seal in respect of its sealing effect and its fastening.

This object is achieved by providing a pleated bellows as a seal held within a recess surrounding the through hole through which the lever projects.

A simple and reliable fastening of this seal can be obtained by an annular clamping ring held in the recess by teeth engaging the wall of the recess, the ring facing the bottom of the bellows seal against the bottom of the recess to create a seal. It is thereby possible by exploiting the surface unevenness of the preferably cast brake carrier to retain the clamping ring firmly and under bias within the recess hole, while assembly can be effected by simply inserting the clamping ring.

In order to augment the surface pressure between the second end of the pleated bellows and the bottom of the recess, it is advisable in further improving this invention to provide a circumferential sealing bead on the bottom surface of the bellows facing the recess bottom. Owing to the thereby increased pressure it is more easily possible to compensate for any unevenness on the bottom of the recess.

To avoid tensile stress within the pleated bellows during the actuating movement of the actuating lever and thus possibly a reduced sealing effect, the bellows is compressed beneath the actuating lever by a step on the lever engaging the bellows seal to compress the seal when the lever is in the retracted position.

The bellows seal is held against the step by the end of the return spring of the actuating lever extending through the lever. Double use is made of the return spring thereby.

In order to keep the pleated bellows as small as possible, the through opening is a slot and the recess and bellows seal are elliptically shaped in this way the sealing surface is arranged as closely as possible around the pivot opening of the lever, and a small sealing surface being obtained as a result. The slotted shape of through the opening further diminishes the possibility of ingress of spray water into the brake's interior and thus supports the sealing effect.

In order to not load the pleated bellows during its actuation, the bellows seal is formed so as to be preloaded when the lever is in the retracted position and largely unloaded when the lever moves to actuate the brake according to the features of claim 5 and/or the employment of the features. Exploiting the axial preload and/or the unsymmetrical design of the pleated bellows in the swivelling direction permit to achieve a substantially symmetrical and tension-free condition of the pleated bellows in the actuating position of the actuating lever. Damage to the pleated bellows by actuation of the lever is thus precluded.

Forming the wall of the recess with a groove, and an interfit attachment on the clamping ring, accomplishes in a simple manner a torsion-preventing means for the clamping ring. The same applies to the pleated bellows by forming a protrusion on the perimeter of the second end interfit into the groove according to claim 10.

An improvement of this invention provides for a simplified assembly of the pleated bellows to the clamping ring by projections formed on the bellows overlying the clamping ring to these elements are combined with the clamping ring to form a construction unit.

One embodiment of the present invention will be explained hereinbelow with reference to the accompanying drawings in which

BRIEF DESCRIPTION OF THE DRAWINGS

FIG. 2, is, on a reduced scale, a partial side view of a clamping ring pertaining to the seal according to FIG. 1;

FIG. 3, is a top view of the clamping ring according to FIG. 2;

FIG. 4, is the pleated bellows according to FIG. 1 in a reduced and cross-sectional side view; and FIG. 5, is a top view of the pleated bellows in FIG. 4.

DESCRIPTION OF THE PREFERRED EMBODIMENT

Figure 1:
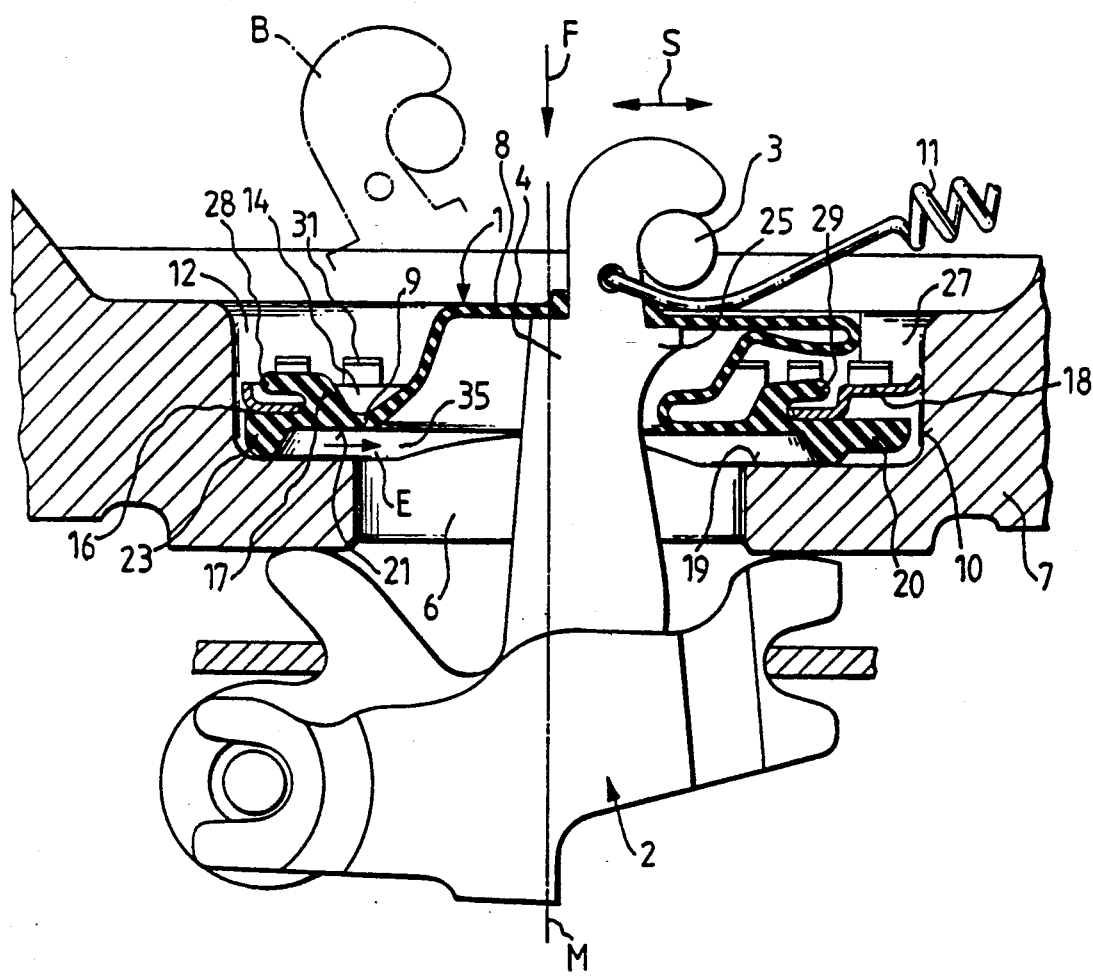
FIG. 1, is a broken and partial cross-sectional view of an actuating lever which is provided at its end with an expanding lock and which extends through a through hole in the brake carrier, as well as of an associated inventive seal.

FIG. 1 shows as an actuating device 2 an expanding lock which is actuated by swivelling an actuating lever 4 in the direction of the double arrow S. The effect of this expanding lock is described in principle on page 135 of the Brake Handbook, 9th edition, of Bartsch publishing house in respect to FIG. 13 and, therefore, shall not be explained herein in more detail. It is essential that the expanding lock is operated by way of the actuating lever 4 which projects through a through hole 6 of a brake carrier 7 illustrated only in a broken fashion. The through hole 6 is slot-shaped and simultaneously may serve as lateral guidance for the actuating lever 4. Making catch at the top end of the actuating lever is the end of a Bowden cable indicated by a circle 3 and moving, in case of need, the actuating lever 4 to assume the actuating position, drawn in broken lines under B, in which the drum brake is operative.

The brake carrier 7 is provided with a recess 12 which is confined by a circumferential wall 10 and by a circumferential surface 19 on the bottom. The recess 12 passes over into the slot-shaped through hole 6, the lateral surfaces of which guide the swivelling movement in the direction of the arrow S of the actuating lever 4. The interior of the brake drum lying beneath the illustrated part of the brake carrier 7 is sealed in relation to the outside space lying above the brake carrier 7 by means of a pleated bellows 1. The first end 8 of the pleated bellows lying in the upper part in FIG. 1 embraces with a correspondingly designed opening an upper portion of the actuating lever, while a circumferential sealing bead 23 abuts on the circumferential surface 19 of the second end 9 of the pleated bellows, which is in the lower part of the drawing, and thereby prevents fluid from entering the drum's inside through the through hole 6.

At its second end 9, the pleated bellows 1 comprises a circumferential edge 17 which carries the sealing bead 23 and likewise receives the force for sealing by the sealing bead 23 which force is applied on the surface 16 of a flange portion formed on the second end of the pleated bellows 1. This force is exerted by a clamping ring 14 which, substantially, is ellipse-shaped (see FIG. 3) and, disposed on the bellows surface 16. The clamping ring 14 is formed on its external periphery with transversely outward sharing teeth 15 which press against the wall 10 of the recess 12 after the clamping ring 14 has been pressed into the oval recess 12.

Starting from the edge (see FIGS. 1, 4 and 5), each end of the pleated bellows 1 is formed with a projection 28, 29 each of forming which a groove with the edge 17. This groove embraces the annular clamping ring 14 on opposite sides from its inner edge so that a single construction unit composed of clamping ring 14 and pleated bellows 1 is formed. This permits rather easy mounting of the seal.

On its side on the right hand in the drawing, the clamping ring 14 is provided with an attachment 18 which projects radially outwardly into a correspondingly shaped groove 27 formed into the wall of the recess 12 this arrangement serves as a torsion-preventing means. In a corresponding fashion, the lower edge 17, of the bellows 1 is formed with an extension 20 which likewise projects into the groove 27 and which serves both for aligning the pleated bellows in relation to the clamping ring and as a torsion-preventing means.

The pleated bellows 1 shown in the unmounted condition in FIG. 4 is of asymmetrical configuration, in its unloaded position as shown in FIG. 4, corresponding basically to the actuating position B in FIG. 1.

The actuating lever 4 is furnished in its upper area on both of its sides with a step 25 which limits movement of the first end 8 of the pleated bellows 1 downwards. Advantageously, preventing movement of the first end 8 upwardly is performed by the end of the return spring 11 which makes catch at an opening in the upper section of the actuating lever.

The teeth 15 can be (yet need not be) distributed over the entire external edge 30 of the clamping ring and are disposed at their ends largely in parallel to the wall 10.

Corresponding cutting edges can enhance the clamping effect.

Upon actuation of the actuating lever 4 from its inactive position shown in FIG. 1 into the actuating position illustrated in broken lines, it may occur that the bellows is expanded in the actuating direction. From this results that the two sides of the lower second end 9 of the pleated bellows are urged crossly to the actuating direction. This may have as a consequence reduction of the sealing effect of the pleated bellows, while simultaneously the material of the pleated bellows extending into the through hole 6 will still disturb the movement of the actuating lever and, possibly, the material may in addition be damaged by the moved actuating lever.

In order to remedy this, the edge of the circumferential surface on each side of the through hole or slot is provided with a cast nose 35, each of protruding which upwardly in the drawing, and which prevent displacement of the corresponding parts of the pleated bellows 1 into the slot or through hole 6 and thus augment the sealing effect. The continuous cast nose 35 shown in FIG. 1 can be replaced by a number of post-type cast noses which are short in their extension in the actuating direction, whereby weight is economized while the effect remains the same.

What is claimed is:

1. A seal arrangement for an actuating lever of a drum brake including a brake carrier having a through hole comprised of a slot, said actuating lever having activated and inactivated positions and projecting through a generally oval recess formed in said carrier surrounding said slot, said recess comprised of a peripheral wall and a bottom surface into which said slot is formed; a seal formed by a pleated bellows having a first end sealingly embracing a portion of said actuating lever projecting away from said recess, and a second end in sealing abutment on said bottom surface of said recess.

2. A seal arrangement as claimed in claim 1, wherein said pleated bellows is formed with a circumferential edge on said second end having a top side and a bottom side lying against said bottom surface of said recess, a substantially elliptical annular clamping ring disposed in said recess and overlying said top side of said pleated bellows circumferential edge, said clamping ring having a peripheral edge formed with a plurality of teeth arranged about said peripheral edge, outward flaring to engage said wall of said recess, said clamping ring forcefully engaging said top side of said pleated bellows circumferential edge keeping said bottom side of said pleated bellows in sealing engagement with said bottom surface of said recess.

3. A seal arrangement as claimed in claim 2, wherein said bottom side of said circumferential edge is formed with a circumferential sealing bead pressed against said bottom surface of said recess surface.

4. A seal arrangement as claimed in claim 3, wherein a projection extends from said recess bottom surface on each side of said slot closer to said slot than said sealing bead, which each project away from the said bottom surface of said recess to prevent sidewards displacement of said second end of said pleated bellows and into said slot.

5. A seal arrangement as claimed in claim 4, wherein two cast noses integral with said brake carrier are provided which are arranged opposite to one another across said slot on said recess bottom surface and which each extend substantially along said slot.

6. A seal arrangement as claimed in claim 2, wherein said recess wall has a groove formed therein and said clamping ring has an attachment formed therein extending outwardly and into said groove, thereby resisting torsional loads.

7. A seal arrangement as claimed in claim 6, wherein said circumferential edge of said pleated bellows is formed with an extension which also projects into said groove.

8. A seal arrangement as claimed in claim 2, wherein said circumferential edge of said pleated bellows is provided with two projections lying opposite each other at either end of said slot, which projections extend over said clamping ring to retain said clamping ring on said pleated bellows flange.

9. A seal arrangement as claimed in claim 2, wherein said pleated bellows is of asymmetrical shape, said first end arranged laterally offset in relation to said second end, so that said first end shifts in the direction of forming a symmetrical structure when said actuating lever moves to said activated position.

10. A seal arrangement as claimed in claim 1, wherein said actuating lever portion projects further away from said recess in said activated position than in said inactivated position, and wherein said first end of said pleated bellows is of elastically resilient material and shaped so as to be compressed axially by said actuating lever with said actuating lever in said inactivated position, whereby to extend outwardly under axial preload as said actuating lever moves to said activated position.

11. A seal as claimed in claim 1, wherein said actuating lever is provided with a step below the first end of the pleated bellows, which step forms an abutment preventing inwardly directed displacement of said first end of the pleated bellows past said abutment.

12. A seal arrangement for an actuating device of the type including a lever member extending through a sealed, stepped opening in a housing laterally displaceable from a center line of said opening between limits of travel, said housing opening surrounded by a recess having an axially directed circumferential wall surface and a radially directed circumferential edge bottom surface, said seal arrangement comprising:
   resilient seal member having a first end sealingly circumscribing and mounted to be displaceable with said lever member;
   a second end of said seal member nestingly disposed within said recess sealingly retained therein;
   an annular clamping ring engaging said wall surface and compressively loading said second end of said seal member against said recess edge bottom surface;
   a resilient pleated bellows portion integrally formed with said seal member interconnecting said first and second ends;
   said recess wall formed with a radially outwardly extending niche and said clamping ring and seal member second ends both formed with portions extending into said niche.

13. The seal arrangement of claim 12, wherein said bellows portion is formed asymmetrically along a line of travel of said lever member whereby said bellows is essentially unloaded when said lever member assumes one end limit of travel furthest from the center line of said opening and is compressively loaded when said lever member assumes the other end limit of travel.

* * * * *